June 18, 1957    M. D. C. RAS    2,795,883
DEEP-SEA FISHING DEVICES
Filed July 7, 1955    6 Sheets—Sheet 1
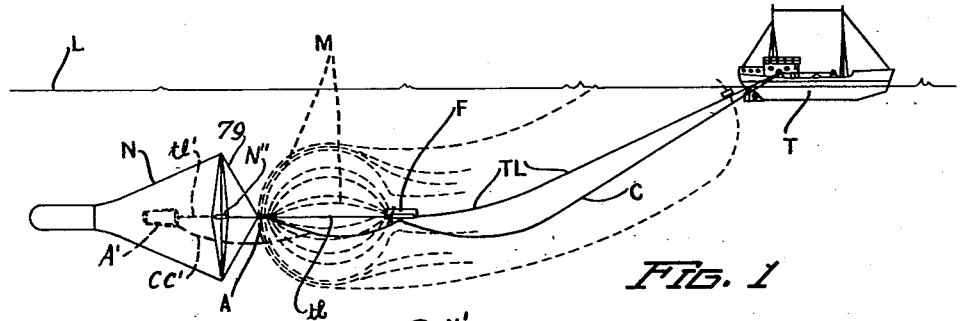
FIG. 1
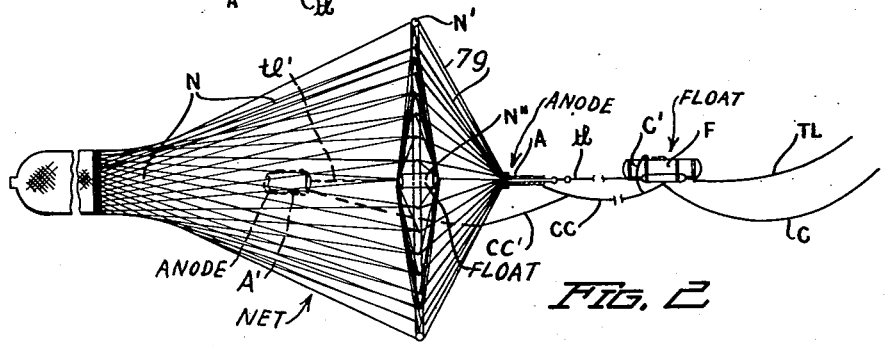
FIG. 2
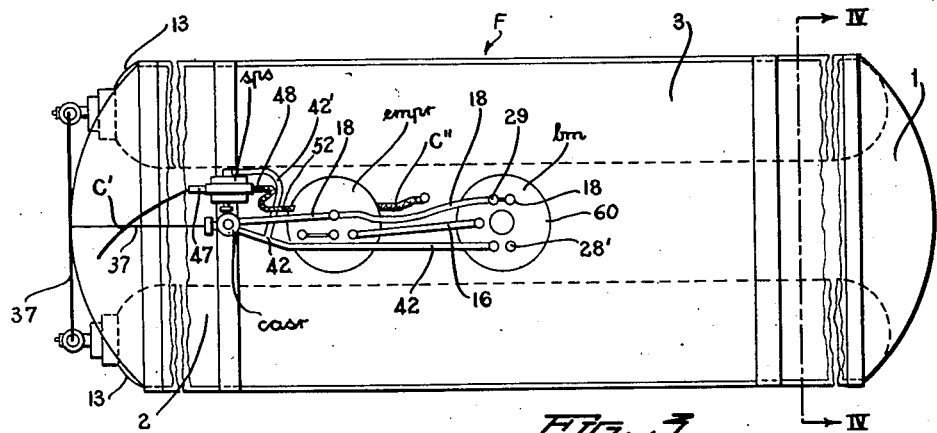
FIG. 3
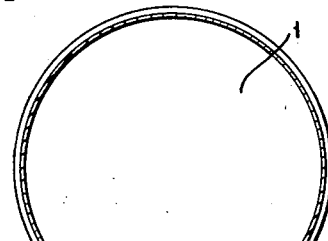
FIG. 4
INVENTOR.
Marthinus David Christiaan Ras
BY
Attorneys.

June 18, 1957 M. D. C. RAS 2,795,883
DEEP-SEA FISHING DEVICES
Filed July 7, 1955 6 Sheets-Sheet 2
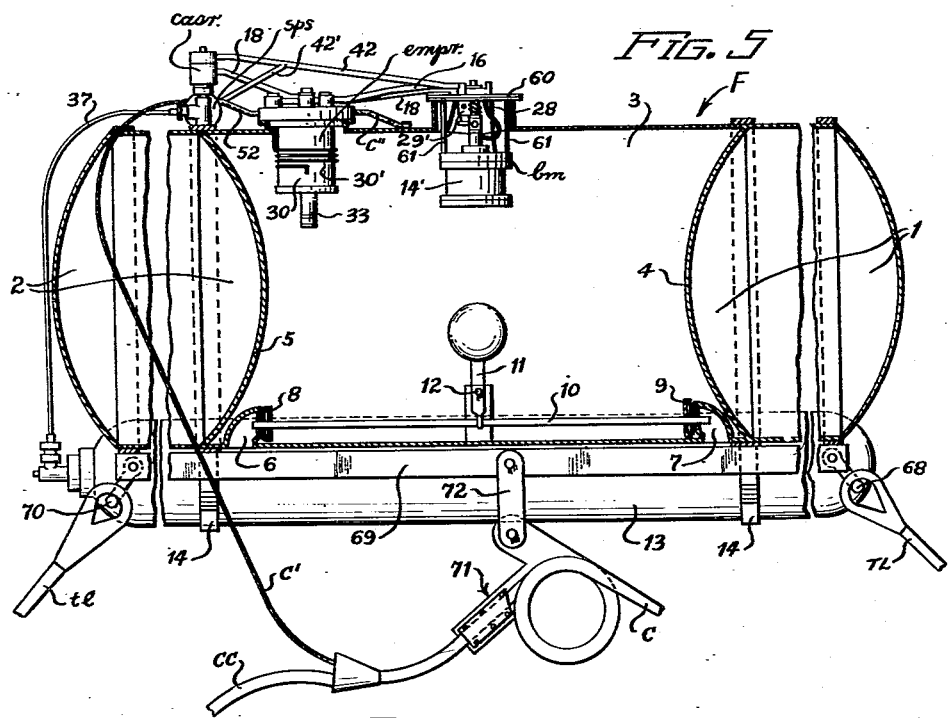
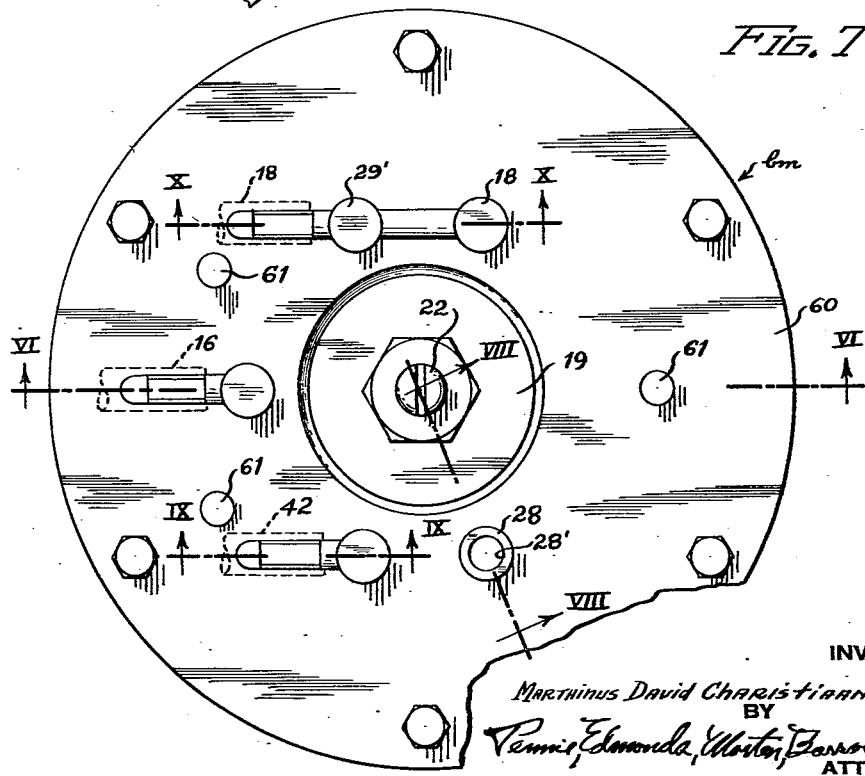

June 18, 1957  M. D. C. RAS  2,795,883
DEEP-SEA FISHING DEVICES
Filed July 7, 1955  6 Sheets-Sheet 3

INVENTOR.
Marthinus David Christiaan Ras
BY
Pennie, Edmonds, Morton, Barrows & Taylor
Attorneys June 18, 1957 M. D. C. RAS 2,795,883
DEEP-SEA FISHING DEVICES
Filed July 7, 1955 6 Sheets-Sheet 4

United States Patent Office 2,795,883
Patented June 18, 1957

2,795,883
DEEP-SEA FISHING DEVICES

Marthinus D. C. Ras, Adelaide, Cape Province, Union of South Africa

Application July 7, 1955, Serial No. 520,599

Claims priority, application Union of South Africa December 7, 1954

12 Claims. (Cl. 43—8)

This invention relates to deep-sea fishing devices of the kind comprising a floating trawl-net and provides such a device adapted for operation at relatively great depths, e. g. up to some 600 feet, as for the catching of pelagic fishes which feed from the surface down to such depths and for which purposes no fully effective catching devices have become available to date. The invention, which may, if desired, and preferably involves the generally-known principle of providing an electric field in the neighbourhood of the submerged trawl-net for the purpose of assisting in the catch and electrocuting the fish for collection in the so-called "cod-end" behind an anodic body inside the open end of the net, and which may also provide a means of enhancing the efficiency of such a field, is more particularly concerned with the means of floating the net at any selected depth, such as may be determined by echo soundings, under a full and accurate control for the trawler vessel and of effecting such control economically and by apparatus devised to withstand the severe conditions to which equipment generally is subject in deep-sea fishing operations.

Broadly according to the invention, a trawl net is floated at a desired adjustable depth by a float structure operated hydrostatically by compressed air from a supply associated with the float and under control electrically from the trawler vessel.

The invention extends to the float structure itself, the various mechanisms or devices operatively associated therewith for its desired functioning, as well as the trawl-net and the towing system in which the float structure is included; as will become clear from the following description in which reference is made to the accompanying drawings.

In these drawings:

Figure 1 is a small scale diagrammatic elevational view showing the apparatus of this invention in operation, i. e. with a trawler vessel towing a trawl-net at a depth established and controlled by a float structure included in the towing cable;

Figure 2 is a slightly larger scale elevational view of the trawl-net and float structure;

Figure 3 is a plan view (shown broken in length) of the float structure referred to above;

Figure 4 is a cross-sectional view of the float taken on the line IV—IV in Figure 3, and Figure 5 is a central longitudinal view, partly in section of the structure shown in Figures 3 and 4.

Figure 6:
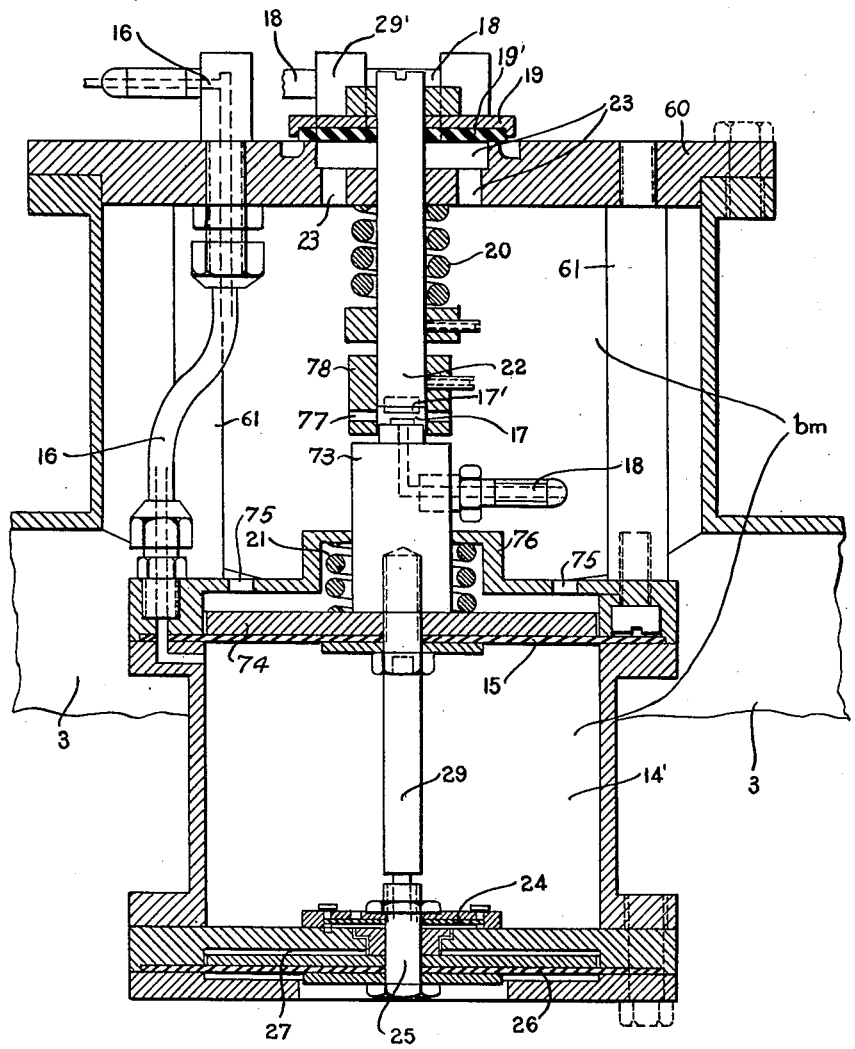

Figure 6 onwards, described below, show the various mechanisms or devices included in the float structure for the control of its buoyancy.

Figure 9:
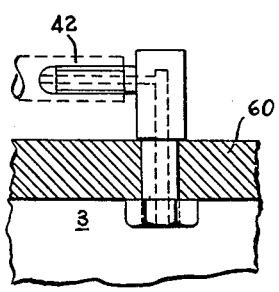
Figure 10:
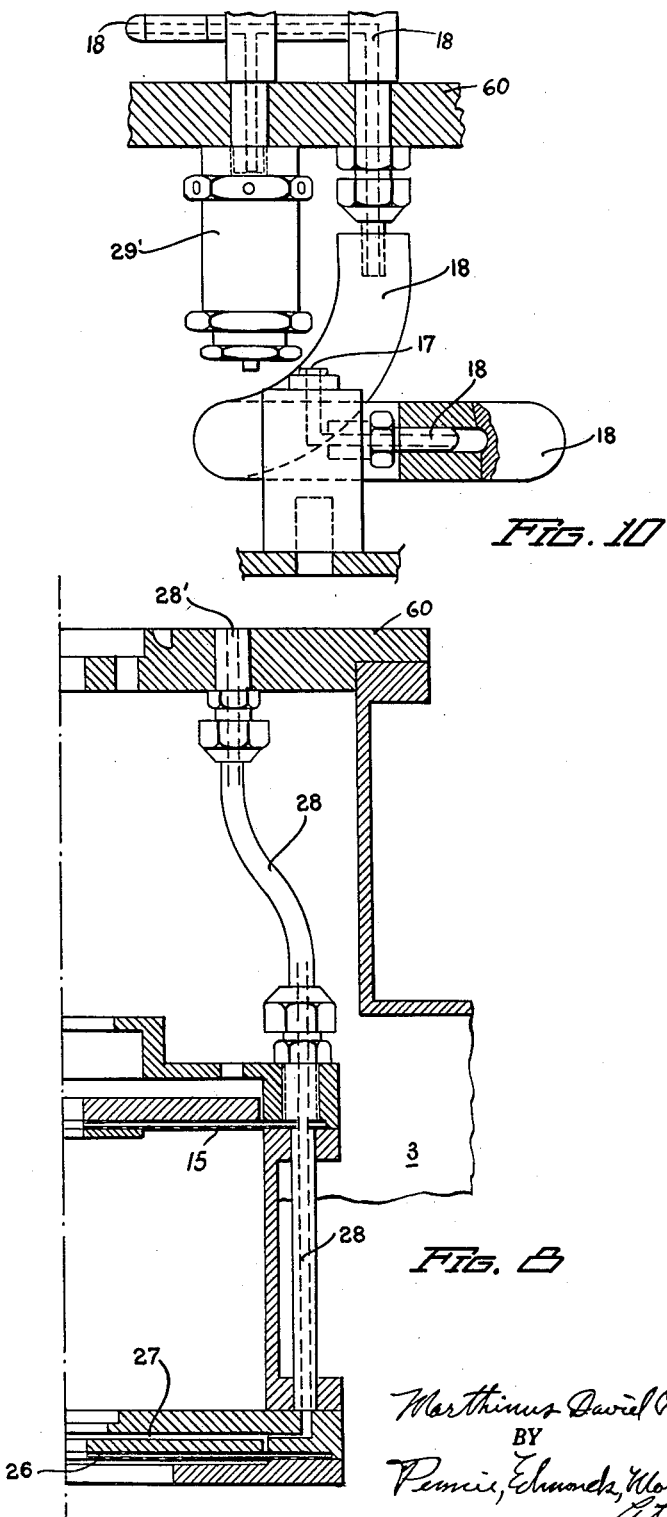
Figure 11:
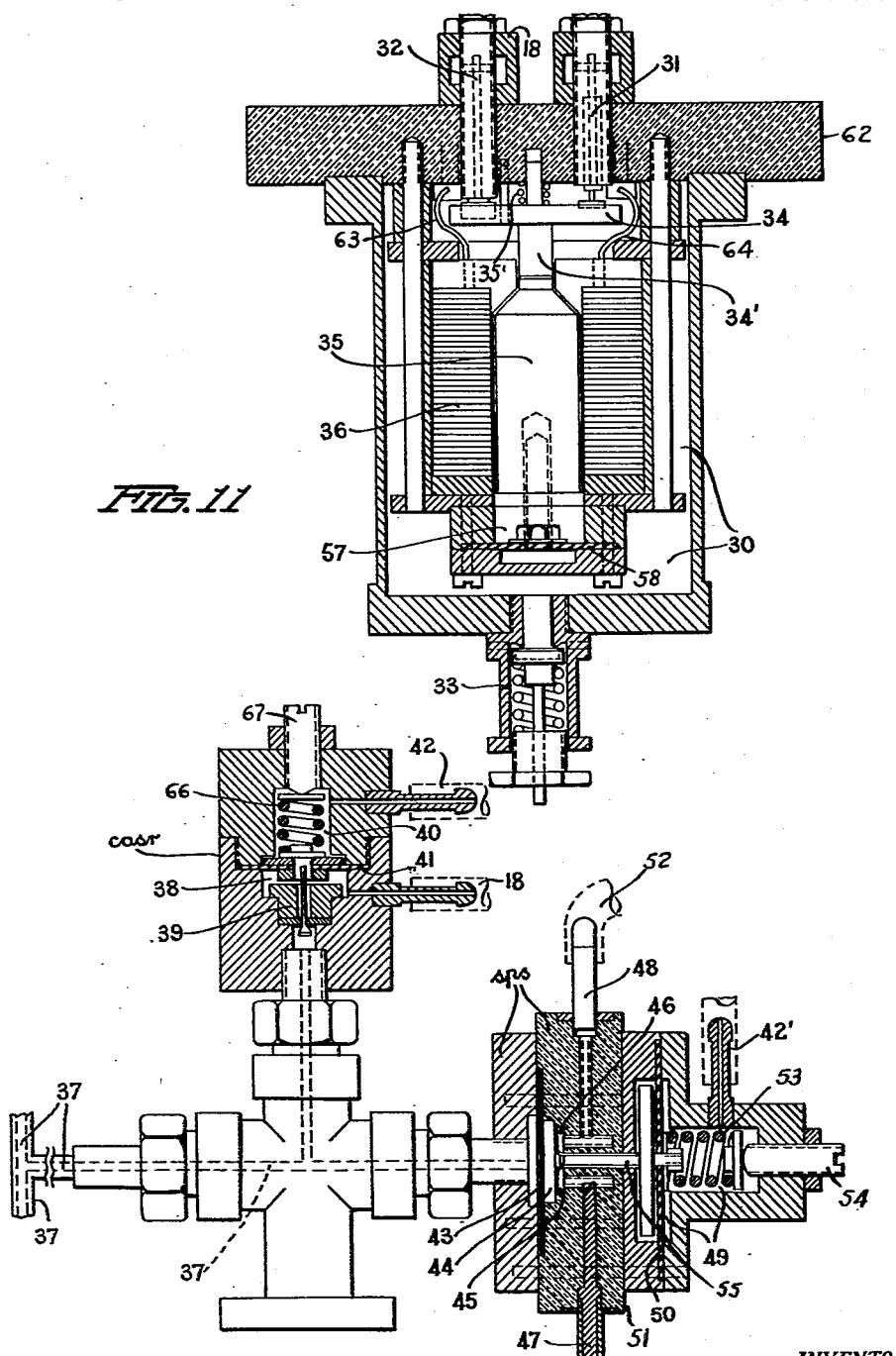
Figure 12:
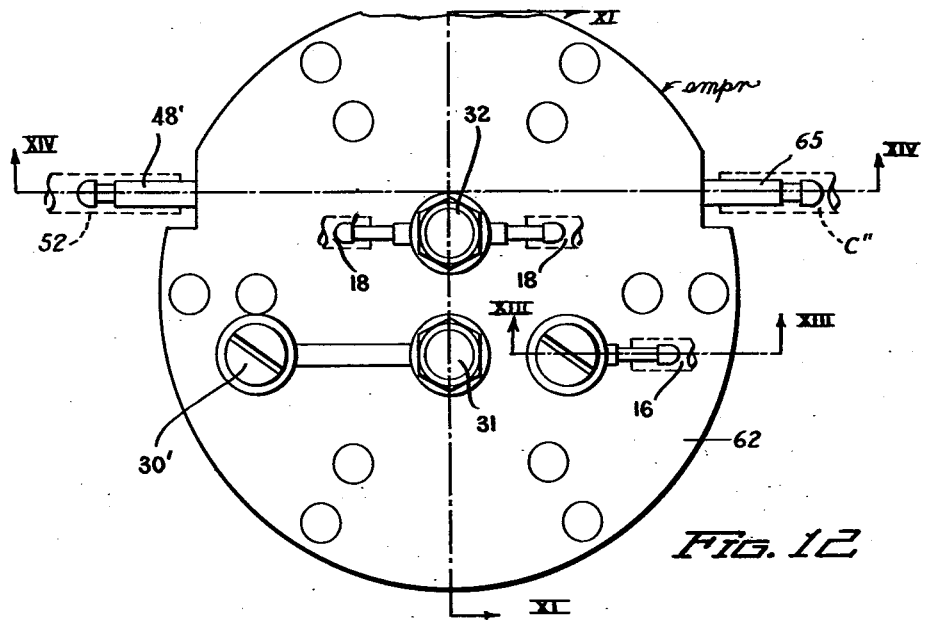
Figure 13:
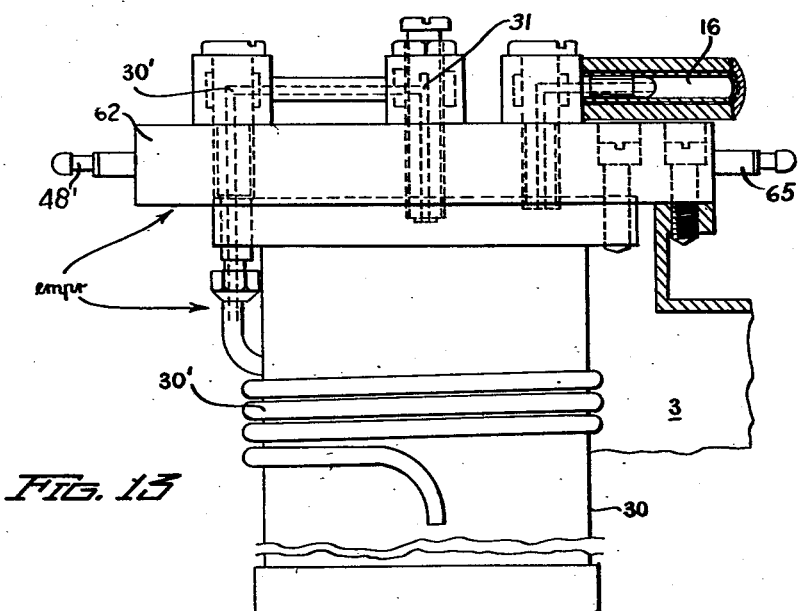
Figure 14:
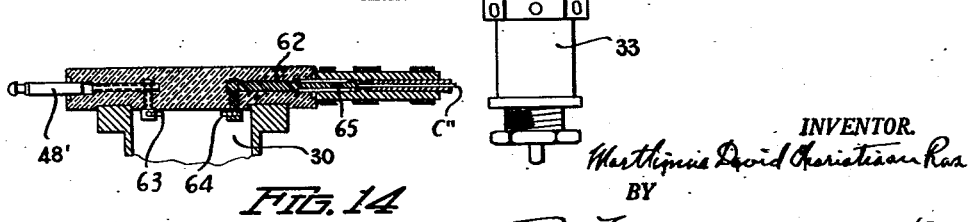

Figure 6 is a vertical sectional view (see line VI—VI in Figure 7 below) of a balancing mechanism determinative of hydrostatic equilibrium of the float structure at a desired depth;

Figure 7 is a plan view of the balancing mechanism shown in Figure 6;

Figure 8 is a half-sectional view taken on the line VIII—VIII in Figure 7;

Figure 9 is a fragmentary sectional view taken on the line IX—IX in Figure 7;

Figure 10 is a fragmentary sectional view taken on the line X—X of Figure 7;

Figure 11 is a vertical sectional view taken on the line XI—XI in Figure 12 of an electro-magnetic pressure regulator for establishing and maintaining (under trawler control) pressures obtaining in a chamber of the aforesaid float structure;

Figure 12 is a plan view of the regulator shown in Figure 11;

Figure 13 is an outside elevational view of the regulator shown in Figures 11 and 12 with an upper region part-sectioned on the line XIII in Figure 12;

Figure 14 is a fragmentary sectional view taken on the line XIV—XIV in Figure 12; and Figure 15 is an elevational view of an assembly of a compressed air supply regulator device and a safety pressure switch device, these devices being shown in section.

In the diagrammatic Figures 1 and 2 the trawl-net N is shown being towed below the sea level L by the trawler vessel T through a tow-line system which includes the float structure F whereof the depth of immersion is determined and controlled electrically from the vessel through a trailing cable C. Operational details, the tow-line system and the mode of creating the electric field M shown in broken lines in front of the net N, are the subject of further description following disclosures now given of the functioning and construction of the float structure and its associated mechanisms and devices.

Referring then to Figures 3, 4 and 5, the float structure above referred to by the general reference F includes a cylindrical drum suitably constructed so as to provide one or more air pressure tanks 1, 2 and also a chamber 3 open to the water but chargeable with air, the relative proportioning of the pressure tanks and chamber and their absolute dimensions also being made such that the buoyancy of the tanks 1 and 2 of the float structure with its associated control and other components later to be described will alone be insufficient to keep the device afloat, whereas when the chamber 3 is evacuated of water by displacement thereof with compressed air, the float structure will then have a sufficient total effective buoyancy to cause it to rise to the surface. Conveniently, for obtaining a balanced float structure from which to tow the net, two similar pressure tanks 1 and 2 are employed, with the aforementioned chamber 3 occurring centrally between them in the cylindrical drum structure shown, partitioned into the required three compartments by the dished partitions 4 and 5. With such basic provisions it follows generally that by varying the volume of air (under relevant barometric pressure) in the central chamber 3 the float structure may be controlled to static equilibrium at any desired depth: by bleeding air from the central chamber the structure is caused to sink, and by forcing air into it, it is caused to rise. For the ingress and egress of water to and from the chamber 3 a pair of remotely located ports 6 and 7 are provided which are controlled for alternate opening and closing by valves 8 and 9 respectively which are motivated through a common connecting rod 10 by a weighted lever 11 adapted to rock about a transverse pivot axis at 12 in such a manner that, at any angle of inclination from horizontality which the float may assume under the water, at least one of the two ports 6 and 7 will be open at the lower or lowest region of the chamber and the other (or higher) port shut.

The supply of compressed air for controlled admission to the chamber 3 is carried on the main body of the float conveniently in bottles 13 strapped securely by straps 14 along its underside, and an electro-magnetic control mechanism is provided, as shown by the general reference *empr* in Figures 3 and 5, operable and adjustable from the trawler, to co-operate with a balancing mechanism, as shown by the general reference *bm* in the said figures, the two mechanisms together providing the float control mechanism for maintaining the necessary barometric equilibrium at any determined or selected depth. Of the two mechanisms *empr* and *bm* it is convenient first to describe the latter, with reference particularly to Figures 6 to 10, this being the mechanism which is directly in compressed air control of the amount of water which is trapped at any time in the chamber 3 above the (lower one of the) ports 6 and 7. Thus, the mechanism or device *bm* comprises a combination of parts the nature and arrangement of which will be generally apparent from the drawings and which is suspended from a closure 60 in the top of the chamber 3 by supports 61 so as to be in fluid communication with the chamber 3. The device comprises a balance chamber 14' having a diaphragm 15 forming its upper cover and which is adapted to be charged with compressed air through a pipe or line 16 to the ambient atmospheric pressure at the depth to which the float must sink. The diaphragm 15 is subjected to the pressure in the chamber 3 and supports a compressed air jet 17 which is fed from the compressed air supply through the pipe or line 18. The jet 17 forms part of a valve assembly comprising the poppet valve 19, including a gasket 19' and a stem 22, which is loaded to a closed position by a compression spring 20 on the stem 22 and bearing against the closure 60. The jet 17 is contained in a housing 73 secured to the upper end of a push rod 29, and receives the end connection of the air supply line 18. When the balance chamber 14' is charged to a pressure above the ambient pressure the diaphragm 15, which is fixed to the push rod 29 and has a buffer plate 74 interposed between it and the bottom of a spring 21, is forced upwardly by the air pressure together with the push rod 29 and buffer plate 74, lifts against the spring 21, closing the jet 17 against a gasket 17' at the lower end of the valve stem 22, and opens the poppet valve 19, thereby allowing the escape of air from the chamber 3 via the ports 23 controlled by the poppet valve 19, as a consequence of which sea water can enter through either of the ports 6 and 7 which may then happen to be open. As a result of the foregoing the float sinks. When ambient pressure at the depth exceeds the charge pressure in the balance chamber 14' the diaphragm 15 falls due to the higher ambient pressure of the air passing from the chamber 3 through ports 75 in the cover 76 of the chamber 14' and acting on the upper surface of the buffer plate 74 and diaphragm 15 to assist the downward action of the spring 21, and as a result, the poppet valve 19 closes and the air jet 17 opens. Air is then blown into the central chamber 3 from the air jet 17 via radially-extending outlet passages 77 disposed in spaced relationship in a guide collar 78, which is fixed to the end of the valve stem 22 and is adapted to slide over the upper reduced end of the air jet housing 73. Due to this entry of air, water is expelled through either or both of the ports 6 and 7 and the float rises.

For any given charge pressure in the balance chamber therefore, the float will find a position at depths wherein both the poppet valve 19 and the air jet 17 are closed and the float will remain suspended. Any force applied to upset this hydrostatic equilibrium will cause the mechanism automatically to readjust it.

When it is required to raise the float from operating depth, the balance chamber pressure is decreased by bleeding air through the line 16, whereby the diaphragm 15 is depressed by spring 21 and the jet 17 blows. Once the chamber 3 is full of air, and the blowing of more air would be mere wastage of air, the jet 17 is shut off in the following manner. The bottom of the balance chamber 14' is covered by a system of differential diaphragms, one being of small area, identified by reference 24, and axially connected by a short shaft 25 to a larger area diaphragm 26 and containing between them a space 27 which is vented at 28' (Figure 8) to the upper part of the float through a conduit or pipe line 28. Between the small diaphragm 24 and the upper diaphragm 15 the push rod 29 is provided. When water is completely expelled from the float chamber 3 hydrostatic thrust on the diaphragm 26 is greater than that on the diaphragm 24, the diaphragm 26 is pushed upwardly, the diaphragm 24 rises and pushes up the diaphragm 15, thereby shutting the jet 17 and keeping is shut until the float is governed to sink again, when the diaphragm 15 resumes control.

When the float structure rises from depth the relative pressure in the supply line 18 increases. In order then to obviate excess pressure tending to burst the hose serving or forming a part of the line 18 a safety valve of suitable construction, see reference 29 (Figure 10), is connected with that line and adjusted to blow at a small pressure above the supply line pressure.

Referring now to the mechanism or device identified above by the general reference *empr* whereby the compressed air supply to the balancing mechanism just described, is effected for establishing and maintaining therein the desired pressures, the mode of construction and general arrangement of the device, which is also supported from a closure so as to be disposed inside the chamber 3, will be apparent from the showing of Figures 11 to 14. The device comprises a regulator chamber 30 in the form of a totally enclosed cylinder attached to the underside of a closure 62 and which is connected to the balance chamber 14' already described, by the pipe or line 16 whereby equal pressures are maintained between these two connected chambers. The closure 62 may be of glass-like electrical insulating material. The chamber 30 is connected to the regulated compressed air supply line 18 and entry of supply air into the chamber 30 is directed through a self-closing valve 32 (of the tyre-tube valve type). The chamber 30 is open to the inside atmosphere of the central chamber 3 of the float structure through a long helically arranged vent tube and conduit 30' and the control of this opening is via another valve, 31, which in this case is self-opening.

The chamber 30 is provided also with a safety valve 33 incorporated in the base, whose main function is for blowing out any water which may accidentally enter the chamber through the vent 30' or the compressed air supply valve. The valves 31 and 32 are placed close together as shown in Figure 11, whereby they may be operated by means of a platform 34 placed below them. With raising of the platform the following events are caused to occur progressively. The vent valve 31 is closed and the supply valve 32 is opened whereby air is blown into the chamber 30. With lowering of the platform the progressive events are, the valve 32 closes whereby pressure in the chamber is now static, the valve 31 then opens to allow air to escape by the vent 30', whereby the chamber pressure drops to ambient atmospheric pressure. These platform movements are controlled by a moving armature 35 of an electro-magnet 36 and a spring 35'. The platform being supported through a stem 34' resting on the upper end of the armature 35, by varying the energising current in the solenoid the platform may be raised or lowered with a controlled degree of force. Below and attached to the armature 35 is mounted a dashpot 57 on the diaphragm 58 on which acts the induced air pressure of the chamber 30. Electric current is supplied to the coil 36 from a terminal 48' connected to the coil by a lead 63, as shown in Figures 11 and 14. A return current lead 64 is connected to a terminal 65 grounded to the metal shell of the chamber 3 by a lead C''. Accordingly the greater the chamber pressure the greater the pull required to lift the dashpot plunger, whence the greater the pressure in the chamber 30 the higher will be the energising current which is required to lift the armature and the platform. In operation of the device described therefore, in response to a particular value of energising current the sequence of events is, raising of the armature 35 and platform 34, closing the valve 31, opening the valve 32, the induction of compressed air into the chamber 30 building up thrust on the dashpot diaphragm 58, the dashpot pull then exceeding the armature pull, the armature and platform lowering, and the valve 32 closing slowly until the pressure thrust on the dashpot 57 and the armature pull are equal. The air pressure in the chamber is static and bears direct relationship to the energising current, and that static pressure now also obtains in the balancing chamber 14' of the associated device described already in detail with reference to earlier figures, whereby the said device now proceeds to complete the operations which have already been described.

Obviously if the current value is then reduced the platform 34 will move lower and allow air to escape through the valve 31 until a new equilibrium is established at a lower pressure in the chamber 30. Interrupting the electric circuits results in the opening of the valve 31 and bleeding of the chamber 30 whereby its pressure is reduced to the ambient atmospheric pressure. Corresponding reactions then occur in the balancing chamber 14' aforesaid, which causes the float structure to rise.

It will be understood that the depth of submergence of the float structure being a direct function of the current supplied to the solenoid and controlled from the trawler vessel, the current controller may be scaled directly in float-submergence depths.

Turning now to the two associated devices indicated in Figures 3 and 5, on the upper side of the float structure, by the respective general references *casr* and *sps*, the former of these is a conventional design one-stage compressed air supply regulator, see detail Figure 15, and the latter is a construction of safety-pressure switch also detailed in that figure.

Referring to Figure 15, hose lines 37 from the compressed air cylinders 13 lead to the branch piece for division of the air to the underside of the device *casr* and through to the device *sps*.

From the regulator space 38 above the valve assembly 39 air supply is taken at regulated pressure via lines (hose) 18 to the device *empr* and via the safety valve 29' also to the device *bm*. The "atmospheric" space 40 above the adjustably spring-loaded diaphragm 41 is vented, in this usage of the device, through the pipe line 42 into the float structure central chamber 3 (see Figures 3 and 7 and also Figure 9). The load applied to the valve by the spring 66 is adjustable by an adjusting screw 67. By this provision, in the case of diaphragm leakage or failure, waste air is blown into the float structure chamber, and the structure rises, thus providing a valuable safety precaution.

In the switch device *sps* whereof the centre body 51 is a suitable insulator, the air pressure on the diaphragm 43 in correct conditions of operation holds a contactor 44 against fixed contacts 45, 46 to complete the electric circuit from the regulable current supply source via the electric cable lead C (see Figures 1 and 2), the lead C' (see Figure 3), the terminals 47, 48 connected respectively to contacts 45 and 46 and the lead 52 to terminal 48' for solenoid energisation in the device *empr*.

Providing a further safety measure, the switch device provides an automatic means of raising the float when the supply cylinder pressure drops below a safe pressure commensurate with the depth at which the float is operating. The rule enforced by the switch is that at any depth the compressed air cylinders 13 must have sufficient air available to inflate the central chamber 3. Should the pressure drop to a critical value the switch automatically interrupts the current and causes the float structure to rise to a safe position. At the same time, the operator is informed by the behaviour of the switch that the air supply for operating at a particular depth has been depleted. It will be noted also that the space 49 occurring on the "atmospheric" side of the adjustably spring loaded diaphragm 50 is vented into the central chamber 3 of the float structure through a branch line 42' connected into the line 42, like the corresponding space in the device *casr*, and for a similar purpose namely to provide a safety measure against loss of air due to possible diaphragm failure. The load applied on the diaphragm 50 by the spring 53 is adjustable by an adjusting screw 54 to provide the critical value. When the pressure of the air in the line 37 at the diaphragm 43 falls below the critical value, the contactor on bridge 44 is pushed away from the contacts 45 and 46 by the spring 53 and an insulated plunger means 55.

It is convenient at this stage to advert to the controlled float structure for furnishing constructional and operational data applicable thereto in a convenient embodiment of this invention. For instance, the float structure F may be of the drum construction already indicated, having a diameter of around 24 inches and a total length of around 10 feet and 6 inches, so partitioned as to provide the two similar pressure chambers 1 and 2 each of 11.1 cubic ft. capacity, with the third chamber or central buoyancy control chamber 3 of 10.4 cubic ft. capacity, the structure being devised to possess a gross buoyancy of 1340 lbs. The pressure chambers 1 and 2 (as well as a float N" associated with the net N as later described) are permanently charged with compressed air to 200 lbs. per square inch, a value which suffices for trawling down to approximately 500 ft. submergence. In this example the supply from the compressed air cylinders 13 is reduced in pressure in the device *casr* above described from some 1800 lbs. per square inch to 50 lbs. per square inch above ambient atmospheric pressure, the supply being as above described through suitably reinforced flexible rubber hose.

As will be understood, the dimensions and other characteristics of the float structure are easily altered to satisfy any particular set of requirements or conditions, whereby dimensions and shapes as above indicated must not be regarded as in any way limiting this patent. Also the material used in the construction may vary with the conditions of intended use, e. g. the main structure may be of mild steel, stainless steel, brasses or other alloys; and it has to be borne in mind that the structure is often subject to electrolytic action as it constitutes the terminal point of an extended cathode liberating hydrogen from its surface in a D. C. circuit which may operate at some 200 to 300 amperes.

Adverting to the safety switch *sps* (Figure 15) it will be clear that for a given combination of the chamber 3 and high pressure cylinder volume in the float structure, and in order to meet the requirement that at any operating depth the chamber must be chargeable from the high pressure cylinders, a definite relationship must exist between the differential diaphragms 43 and 50 of the switch. This is a matter of calculation which leads, in the case of a float structure having gross buoyancy 1345 lbs. and volume characteristics already specified by way of example, and with high pressure cylinder volume of 4.4 cubic feet giving with the said 10.4 cubic feet of the central chamber 3 the total volume of 14.8 cubic feet, to the choice of differential diaphragm area ratio about 5:1 if the safe minimum pressure at say 600 feet submergence be not considered too high for the gross buoyancy, or more preferably to the choice of the lower ratio 3.5:1 with the use also of a spring load (by spring 53) in the larger diaphragm, equivalent to some 50 lbs. in the smaller diaphragm, whereby for instance at 50 feet submergence the safety pressure as regulated (the sum of the hydrostatic diaphragm pressure 78 lbs. per square inch and 50 lbs. per square inch) is 110 lbs. per square inch (calculated) and at 600 feet submergence the safety pressure (940 lbs. plus 50 lbs.) is 990 lbs. per square inch (calculated). Such provision caters for operation of the apparatus efficiently and satisfactorily at both small and large depths of submergence.

Returning now to Figures 1 and 2, for economical fishing at depths which may be so great as those referred to above and which require accordingly special equipment of a kind which has been disclosed in detail above, the trawl-net, whereof the general structure is sufficiently indicated in Figure 2, should be made of substantially larger size and mouth diameter than customary. The ring N′ of the net N may accordingly be made of some 40′ diameter, and when of such a size must accordingly be formed in sections which are readily assembled and dismantled at sea. Thus the ring, constructed as usual in steel for strength, may be formed in a number of segments which are complementarily attachable to one another by simply-made stout spigot and socket or like joints with cross-cotters or the like for locking the sections together in the necessarily rigid assembled state.

The net assembly is rendered buoyant by the inclusion in it of a float N″ which is initially and kept permanently charged with compressed air at the like pressure to that of the chambers 1 and 2 of the float structure F, the float N″ being separate and independent of said chambers and forming a part of the net assembly. As shown in Figures 1 and 2, the float structure F, which is electro-pneumatically controlled from the trawler T, essentially supports the ends of the towing cables and the electric cable C. The buoyancy of the pressure chambers 1 and 2 of the structure F is made such that the apparatus is buoyant when located within approximately 400′ from the vessel. Beyond such distance the weight of the cables and the like will enable the float structure to sink and rise under control as already explained, i. e. by flooding and evacuating the central chamber 3 thereof.

The connection between the float structure F and the net N is electrically non-conductive, e. g. hemp rope.

Provision is also made in a simple and yet highly-effective manner for the creation and concentration of an electric field between a cathode associated with the trawler vessel and an anode body associated with or inside the mouth of the trawl-net, the object of the electric field being to control the movements of the fish to facilitate their capture and to electrocute or stun them. Such a field, which is indicated generally by the dotted lines M in Figure 1, is created between an extended cathode provided by the float F and the tow line, namely a steel wire TL, and a graphite anode indicated at A to which the insulated cable C is connected by a suitable extension shown at CC, the connecting tow line tl being non-conductive, e. g. a hemp rope. The field is thus concentrated between the net and the float F, but due to the extended cathode provided by the tow line TL, the field extends also all the way back to the trawler T.

If preferred, an additional concentrated field may be established inside the net by suitably mounting therein a graphite anode A′, and shown in broken lines in Figures 1 and 2, to which the (positive) insulated cable extension CC is connected by a further cable extension CC′, shown as a broken line. In this case the anode A, while being connected by the non-conductive rope tl to the negative or cathode side is also connected to the net ring N′ through steel wire net traces 79 or the like. The path of this additional electric field is not shown in the drawings. In this case the anode A′ is connected to the float N″ or to any other suitable part of the net structure by means of a non-conductive rope tl′ shown as a broken line in Figures 1 and 2 of the drawings.

In the foregoing examples the field current may be of the order of 250 to 300 amperes, and the anode (and sub-anode) may be graphite cylinders 40 inches long and 8 inches in diameter; the effective field current being not less than about 1 milliampere per square inch of average cross-sectional area of the fish. The dimensions may of course be varied to suit the size of net and the size of fish to be caught. A current of 5 milliamps passing through any fish will suffice to narcotize it, higher current concentrations will kill it. The electrical resistance of fish suspended in sea water is very nearly equivalent to the resistance of the sea water. Therefore, depending on the average cross-sectional area-size of the fish to be caught, an electrical field of optimum density is created by varying either the diameter of the field or the total current. The diameter of the field is altered by varying the length of the non-conductive connecting rope, since its length is equal to the diameter of the field.

In order to guard against the danger of a sub-anode forming on the controlled float structure F approximately the forward two-thirds of the structure should preferably be given a protective paint cover or other such insulation, failing which very heavy corrosion may result both on the forward end of the structure and on the tow line near to the latter. It is also a matter of much importance to provide a sound electrically bonded connection between the tow rope TL and the float structure, which is shown in Figure 5 as a simple shackle connection 68 to the forward end of a drawbar 69 welded to the bottom of the float cylinder while the rear end is similarly shackle-connected by a shackle 70 to the hemp rope tl for towing the net.

In a preferred construction of the net itself the cod end is composed of tarred twine, the net body of nylon and the ring N′ of high tensile steel tubing of some 10 lbs. per foot weight. The net traces 79 may be about ⅛″ stainless steel wire rope and the net float N″ or floats may be mild steel or stainless steel or alloy, depending upon the life required of these items.

For the electric supply cable C as also for its extension CC to an anode or sub-anode a two-core rubber insulated cable is preferred, with one core carrying the 250 to 300 amperes D. C. field current and the other to carry the zero to 40 amperes current applied through cable lead C′ to the solenoid in the float structure. The solenoid return lead is of course the steel wire tow rope TL. The end portion of the cable C at the float F is secured to a mounting member 71 pivotally supported on the central portion of the drawbar 69 by a pair of links 72, as shown in Figure 5. A cable as aforesaid preferably also includes a steel wire insulated core, the copper being carried concentrically between rubber insulations, a cable of such character possessing the necessary tensile strength. The power supply may be derived conveniently from a diesel-generator delivering up to 300 amperes at 75 volts D. C., although the invention is in no wise limited thereby.

With reference to the apparatus in general, or other than the various electrical components, use should be made in the construction of the apparatus of stainless steel, naval brasses and other suitable alloys and materials having due regard to the various electro-chemical reactions such as can arise with more or less detrimental effects between materials in the use of the apparatus which is required to operate immersed in or wetted by brine.

What I claim is:

1. Apparatus comprising a variable buoyancy float structure adapted to be towed at a variable depth of submergence in the sea and for the towing in turn of a trawl-net, which float structure comprises at least one tank chargeable with air so as to retain compressed air at a determined pressure, at least one chamber having port means through which it may be filled by the sea water and means respectively for the controlled admission and escape of compressed air for variation and adjustment of the extent to which the chamber is so filled and accordingly for adjustment of the gross buoyancy of said structure and the depth of submergence at which it assumes static equilibrium, compressed air supply means in the form of a compressed air container carried directly by the float structure and serving said controlled air admission and air escape means, these latter means comprising a valve delivering air into said chamber and resiliently loaded in open position, a valve discharging air from the upper part of said chamber and resiliently loaded in closed position, which two valves are operatively connected for alternate opening and closing, means for motivating the former valve between open and closed positions, which motivating means consists of a member displaceable by a diaphragm subjected on opposite sides respectively to air pressure obtaining in the said chamber and to air at a pressure variable with respect to ambient pressure outside the float structure, the said controlled air admission and escape means also including a further pair of valves whereof one is self-closing and the other is self-opening, the former controlling supply from the compressed air supply means to one side of the aforementioned diaphragm and the latter valve controlling escape of air from said one side of the diaphragm, said pair of valves being operatively interconnected for alternate opening and closing, and means for motivating the two valves between opened and closed positions which motivating means comprises an armature of an electric solenoid energisable under remote control from the exterior of the float structure.

2. Apparatus according to claim 1 wherein said controlled air admission and escape means comprises in addition a pair of differential diaphragms connected for co-ordinated movement and defining between them a space vented directly to the exterior of the float structure and of which differential diaphragms the opposite outer sides are exposed respectively to the air pressure obtaining in the said chamber and to the variable air pressure to which one side of the firstmentioned diaphragm is subjectable under control of said further pair of valves, and a member movable in sympathy with the connected diaphragms, which member is operatively connected for transmitting movement to the motivating member which is displaceable by the firstmentioned diaphragm.

3. Apparatus according to claim 1 comprising operatively associated with the solenoid armature, means acting on the latter contrarily to the remotely controllable solenoid-energising force, with a force proportional to the pressure differential existing at any time between the air pressure obtaining in said chamber and said variable pressure to which one side of the firstmentioned diaphragm is subjected.

4. Apparatus according to claim 3 wherein said contrarily-acting means consists of a diaphragm dashpot whereof the diaphragm is exposed on opposite sides to said pressure differential.

5. Apparatus according to claim 1 including a safety valve between the compressed air supply means and the controlled air admission means served thereby, and disposed to relieve excess pressure into said chamber.

6. Apparatus according to claim 1 including a safety valve located and arranged to relieve into said chamber, pressure obtaining on the variable air pressure side of the firstmentioned diaphragm.

7. Apparatus according to claim 1 including between the compressed air supply means and the controlled air admission means, a compressed air supply regulator comprising a valve controlling diaphragm and a vent connection from the diaphragm rear side into said chamber.

8. Apparatus according to claim 1 including an electric circuit for the solenoid energisation and having make-and-break switch means in said circuit, contacts in the switch means engageable and disengageable for solenoid circuit completion and breaking, a diaphragm system for motivating the contacts and arranged to be subject to the pressure differential between the compressed air supply means pressure and the pressure obtaining in said chamber, said diaphragm system being resiliently loaded in the direction to disengage the said contacts when the former pressure falls below a predetermined value.

9. The combination of apparatus as claimed in claim 1, including a tow line extensible between the float structure and a trawler vessel provided with an electrical generator apparatus, and means providing an electrical supply connection from said generator apparatus on said vessel to the electric solenoid included in the float structure.

10. The combination claimed in claim 9 including a trawl net and a towline thereto from the float structure, and a float associated with the trawl net for making it buoyant.

11. The combination claimed in claim 10 including electrical anode means associated with the trawl-net mouth, cathode means adapted to be associated with a supply vessel provided with electrical generator apparatus and extended towards the net, and means providing an electrical supply connection from said generator apparatus on the supply vessel to energise the anode and cathode means whereby to create an electric field concentrated in front of the net.

12. The combination claimed in claim 11 and wherein the first mentioned anode means is located forwardly of the net mouth and further anode means is provided, the first anode means serving as a sub-anode with respect to the further anode means and the further anode means providing a concentrated field inside the net.

References Cited in the file of this patent

FOREIGN PATENTS

| 176,096 | Great Britain | Feb. 27, 1922 |
| 70,706 | Norway | July 15, 1946 |
| 693,229 | Great Britain | June 24, 1953 |
| 864 | Germany | Jan. 17, 1955 |